(12) United States Patent
Spalka et al.

(10) Patent No.: US 8,266,435 B2
(45) Date of Patent: Sep. 11, 2012

(54) METHOD FOR GENERATING AN ASYMMETRIC CRYPTOGRAPHIC KEY PAIR AND ITS APPLICATION

(75) Inventors: Adrian Spalka, Koblenz (DE); Jan Lehnhardt, Koblenz (DE)

(73) Assignee: CompuGROUP Holding AG, Koblenz (DE)

( * ) Notice: Subject to any disclaimer, the term of this patent is extended or adjusted under 35 U.S.C. 154(b) by 390 days.

(21) Appl. No.: 12/692,672

(22) Filed: Jan. 25, 2010

(65) Prior Publication Data

US 2011/0185177 A1 Jul. 28, 2011

(51) Int. Cl.
*H04L 9/32* (2006.01)

(52) U.S. Cl. .................. 713/171; 713/179; 380/277

(58) Field of Classification Search .............. 726/26, 726/27, 28; 713/171, 156, 175, 176, 189; 380/44, 46, 277
See application file for complete search history.

(56) References Cited

U.S. PATENT DOCUMENTS

| | | | | |
|---|---|---|---|---|
| 2004/0109567 | A1* | 6/2004 | Yang et al. | 380/277 |
| 2011/0154025 | A1* | 6/2011 | Spalka et al. | 713/156 |
| 2011/0154044 | A1* | 6/2011 | Spalka et al. | 713/176 |
| 2011/0154054 | A1* | 6/2011 | Spalka et al. | 713/189 |
| 2011/0154055 | A1* | 6/2011 | Spalka et al. | 713/189 |
| 2011/0154056 | A1* | 6/2011 | Spalka et al. | 713/189 |
| 2011/0173455 | A1* | 7/2011 | Spalka et al. | 713/189 |
| 2011/0179286 | A1* | 7/2011 | Spalka et al. | 713/189 |
| 2011/0185188 | A1* | 7/2011 | Spalka et al. | 713/189 |
| 2011/0191590 | A1* | 8/2011 | Darbellay et al. | 713/175 |
| 2011/0268269 | A1* | 11/2011 | Spalka et al. | 380/44 |
| 2011/0307961 | A1* | 12/2011 | de Perthuis | 726/26 |
| 2012/0063594 | A1* | 3/2012 | Spalka et al. | 380/44 |

FOREIGN PATENT DOCUMENTS

| | | |
|---|---|---|
| DE | 10258769 A1 | 6/2004 |
| DE | 102004051296 B3 | 5/2006 |

OTHER PUBLICATIONS

Lin, Y.; Maozhi, X.; Zhiming, Z.: 'Digital signature systems based on Smartcard and fingerprint feature' Journal of Systems Engineering and Electronics Bd. 18, Nr. 4, 2007, pp. 825-834.

* cited by examiner

*Primary Examiner* — Jeffrey Pwu
*Assistant Examiner* — Nega Woldemariam
(74) *Attorney, Agent, or Firm* — Hulsey, P.C.; William N. Hulsey, III; Loren T. Smith

(57) ABSTRACT

The invention pertains to a method, computer readable medium, and data processing system for generation of an asymmetric cryptographic key pair including reception of an arbitrarily selectable login name, calculation of a first data object key, whereby a random value and the login name are included in the calculation, and calculation of a second data object key from the first data object key, whereby the first and second data object keys form the asymmetric cryptographic key pair.

19 Claims, 6 Drawing Sheets

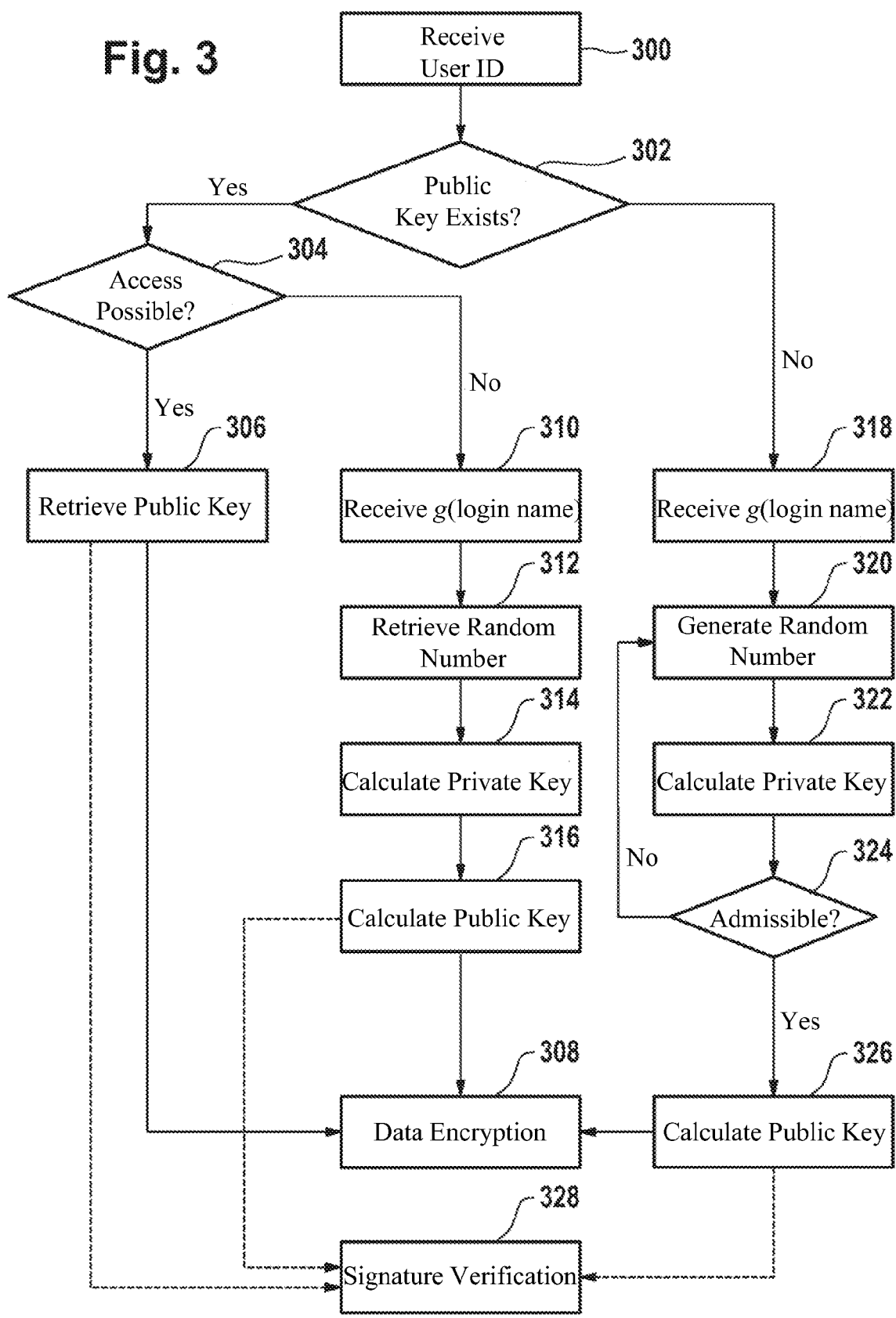

METHOD FOR GENERATING AN ASYMMETRIC CRYPTOGRAPHIC KEY PAIR AND ITS APPLICATION

FIELD OF THE INVENTION

The invention pertains to a method for generating an asymmetric cryptographic key pair and its application, such as, for example, methods for encryption, decryption, digital signing and digital signature verification of data objects, as well as further cryptographic operations, computer program products for implementation of process steps for generating an asymmetric cryptographic key pair and computer program products for implementation of process steps for encryption, decryption, digital signing and digital signature verification of data objects, as well as further cryptographic operations.

BACKGROUND OF THE INVENTION

The electronic health card, abbreviated as eGK[1], should replace the health insurance card in Germany in the future. The goal thereby is to cost-effectively configure, simplify and accelerate data transfer in future among medical care providers, health insurance companies, pharmacies and patients. This also entails, among other things, the enabling of access to an electronic medical report, an electronic medical file, and an electronic prescription with the aid of the electronic health card.

[1] eGK—elektronische Gesundheitskarte=electronic health card

For example, therefore, medical data objects (MDOs) such as an electronic medical report, an electronic medical file, or an electronic prescription can be encrypted and stored with digital signature on a central server. Encryption thereby takes place preferably using a symmetrical key that is individually and randomly generated for each new medical data object of an electronic medical file such as an electronic medical report or an electronic prescription. The symmetrical key itself is encrypted after its creation, for example, with a public key and stored on the central server together with the encrypted medical data objects. This public key used for encryption, together with a private key, which is saved on the electronic health card, thereby forms a cryptographic asymmetric key pair. This ensures that access to the encrypted medical data objects is possible only through use of the secret health card key. During such access, the encrypted symmetrical key is first decrypted by means of the secret health card key, whereupon further decryption of the medical data objects is possible with the decrypted symmetrical key. If during the creation of an MDO a digital signature with the secret health card key was also generated, then subsequently the integrity of the MDO and the authenticity of the MDO generator can be verified via the digital signature.

For example, DE 10 2004 051 296 B3 discloses a method for storing and querying data and corresponding computer program products. A personalized chip card enables storage of a virtual patient file on a data server. With the use of the chip card, data such as an MDO of a patient file, can be transferred encrypted and digitally signed from the data processing system of a medical practice to a data server.

Another application of chip cards for patient data is known from DE 102 58 769 A1.

The use of a chip card for encryption and decryption of medical data objects has the disadvantage that the card must always be carried by a patient and that a chip card reader must be present at the place of use. Thus, if a patient does not have his electronic health card, or there is no chip card reader available, it is not possible to access the patient's stored, encrypted medical data objects in any way during the medical consultation.

Lin, Y.; Maozhi, X.; Zhiming, Z.: "Digital signature systems based on Smartcard and fingerprint feature" in: Journal of Systems Engineering and Electronics, Vol. 18, No. 4, 2007, pp. 825-834, is concerned with signature systems based on Smartcards and fingerprint characteristics. Thereby a cryptographic key stored on the Smartcard is accessible only if the corresponding fingerprint characteristics agree with a master that is stored on the Smartcard.

BRIEF SUMMARY OF THE INVENTION

In contrast, the instant subject matter is based on the challenge of developing a better method for generation of an asymmetric cryptographic key pair and applications for the same, such as methods for encryption, decryption, digital signing and digital signature verification of data objects, as well as further cryptographic operations, computer program products for implementation of process steps for generation of an asymmetric cryptographic key pair, and computer program products for implementation of process steps for encryption, decryption, digital signing and digital signature verification of data objects, as well as further cryptographic operations.

The problems on which the invention is based are each solved with the characteristic features of the independent patent claims. Preferred embodiments of the invention are given in the dependent patent claims.

According to embodiments of the invention, a method for login name-based generation of an asymmetric cryptographic key pair is created, whereby the method incorporates the following steps:

1. Reception of a unique user identification and an arbitrarily selectable login name assigned to the user ID.
2. Mapping of the login name to a value through a function g. The function g can be an identity function or a non-trivial function. For security and confidentiality, g is preferably chosen as a collision-free one-way function such as a cryptographic hash function.
3. Generation of a random value z.
4. Calculation of a first data object key through application of a function f to g(login name) and z. For example, g(login name), that is, the result of the application of function g to the login name, and z are linked with one another, and the function f is applied to the result of this linking. For security purposes, f is preferably a collision-free one-way function; for example, f can be a cryptographic hash function that is applied to the concatenation of the hash value of the login name and the random value z.
5. Calculation of a second data object key from the first data object key, whereby the first and second data object keys form an asymmetric cryptographic key pair. For example:
    for elliptic curves, the second data object key, which is a point on the elliptic curve, can be calculated through multiplication of the first data object key, which represents a whole number, with the base point from the domain parameters;
    for RSA the second data object key (a whole number) is calculated such that with the first data object key (also a whole number) it fulfills a congruence relation defined in the RSA method.

For example, now
    data object can be encrypted with the second data object key and decrypted with the first data object key. Thereby the data object (e.g., a medical data object) can either be encrypted directly with the second data object key, or the data object is first encrypted with a randomly selected symmetrical key, which is then asymmetrically encrypted with the second data object key.

a data object can be digitally signed with the first data object key and the digital signature verified with the second data object key.

another cryptographic method can be employed with this key pair.

In a further aspect, the invention pertains to a computer program product with processor-executable instructions for implementing process steps for generation of an asymmetric cryptographic key pair, whereby the method incorporates the following steps:

1. Reception of a unique user identification id and an arbitrarily selectable login name pw assigned to the user ID.
2. Mapping of the login name to a value through a function g. Function g can be an identity function or a non-trivial function. For security and confidentiality, g is preferably selected as a collision-free one-way function such as a cryptographic hash function.
3. Generation of a random value z.
4. Calculation of a first data object key through application of a function f to g(login name) and z. For example, g(login name), that is, the result of the application of function g to the login name, and z are linked with one another, and the function f is applied to the result of this linking. For example, f can be a cryptographic hash function that is applied to the concatenation of the hash value of the login name and the random value z.
5. Calculation of a second data object key from the first data object key, whereby the first and second data object keys form an asymmetric cryptographic key pair. For example:
   for elliptic curves, the second data object key, which is a point on the elliptic curve, can be calculated through multiplication of the first data object key, which represents a whole number, with the base point from the domain parameters.
   for RSA, the second data object key (a whole number) is calculated such that with the first data object key (also a whole number) it fulfills a congruence relation defined in the RSA method.

Implementation of said process steps has the advantage that asymmetric cryptographic key pairs can be generated here, whereby this takes place using an arbitrarily selectable login name. The login name itself goes into the calculation algorithm for the first and second data keys.

This is one thing that differentiates this method for generating an asymmetric cryptographic key pair from established key generation methods in which, according to today's state of the art, assignment of an arbitrarily selectable login name is possible only to an associated generated cryptographic key pair, but a functional calculation of key pairs using the arbitrarily selectable login name itself, in which the permanent storage of assignment of login name to the key can be dispensed with, is not possible.

In conventional methods up to now, an arbitrarily selectable login name or its map is saved in a table and uniquely assigned to public and private keys, whereby only administrative and/or legal rules stipulate that unauthorized persons may have no access to the private key. This approach significantly impairs the security: If as a result of various monitoring laws an unauthorized person or a public agency receives access to the database that allocates the passwords to public and private keys, this person or organization is immediately able to obtain access to all data objects of a person through access to this single key-administering institution.

Thus the method according to the present invention for generation of an asymmetric cryptographic key pair has the advantage that along with the possibility of an arbitrarily selectable login name, no central entity can come into possession of the combination of login name (e.g. password) and key pairs. The first data object key can be calculated solely with knowledge of a random value and the login name. The generation of the second data object key also requires knowledge of the random value and the login name, whereby the login name preferably is secret, known only to the respective user. Thus it is no longer possible, through confiscation or theft of central database servers, for example, to obtain access to data object keys and thereby to encrypted data without active assistance from those persons who are in possession of their private, secret login name.

Another advantage of the method according to the disclosed subject matter is that even with the selection of the same login name by different users, due to the use of the random value in the generation of the first data object key, it can be ensured that the identical key pair is never allocated to different users.

It must be noted here that embodiments of the method according to the present invention for generation of an asymmetric cryptographic key pair can be applied to any cryptographic systems for generating asymmetric key pairs, such as the RSA cryptographic system, the Rabin and Elgamal cryptographic systems, or cryptographic methods on elliptic curves. The second data object key is calculated from the first data object key, which one has received based on the login name and the random value, whereby such methods can be used for this calculation.

Here it can be necessary for the first data object key to have one or more specified characteristics and/or to fulfill conditions that are checked in the scope of an admissibility test. If the first key proves to be inadmissible for a chosen method, a new random value is generated in order to create a new candidate for a first data object key, which then in turn is subjected to an admissibility test. This is repeated until an admissible first data object key has been found. In this admissibility test, restrictions can apply which arise directly from the algorithm for implementation of a corresponding asymmetric cryptographic key generation method.

Moreover, further restrictions can go into the admissibility test, which relate, for example, to the entropy of the generated key or arise from updated findings regarding the vulnerability of the respective key generation method. For example, for the RSA method there is a series of generally known and regularly supplemented restrictions whose observation is required for key generation by government agencies in order to minimize the vulnerability of the generated key pairs. For example, PKCS#1 (Public Key Cryptography Standards) specifies a series of cryptographic specifications for RSA which must be adhered to by public and private RSA key pairs. Standard PKCS#13, now in development, will establish requirements for key generation on elliptic curves.

One aspect of the invention is that the calculation of the first data object key takes place using a function g, applied to the login name pw. According to one embodiment, either the arbitrarily selectable login name is received as such and thereupon converted using the function g, or the functional value g(pw) is received directly.

The calculation of the first data object key using the value $b=g(pw)$ and the random value z has the advantage that relatively unsecure login names can be used to calculate input values that have a high randomness and thereby effectively further increase the security of the first data object key in the calculation of this key. For example, for g, the cryptographic hash function SHA-256 is used.

According to another embodiment of the invention, the first data object key is calculated through application of a function f to the values b and z. For example, f can be defined as the application of the cryptographic hash function SHA-256 to the concatenation, that is, the serial linking of b and z.

A high quality of the first data object key is ensured through application of the function f to the random value z and the function value g(pw). In other words, the first data object key also features a high randomness due to the random selection of z, such that guessing the first data object key is made practically impossible.

According to one embodiment of the invention, the key pair for a cryptographic system is calculated on elliptic curves. An elliptic curve is given by the equation $y^2=x^3+ax+b$, whereby the parameters a and b, like the coordinates of the points (x,y) on the curve, are whole numbers from the interval [0, n−1]. The values a, b, n, as well as a selected curve point P, form the so-called domain parameters of the elliptic curve, which must be disclosed for execution of cryptographic methods using the first and second keys. The number of points that fulfill the equation of an elliptic curve is designated as the order of the curve. The first data object key represents a natural number, and the second data object key, a point on the curve, is the result of the multiplication of the first data object key with the curve point P of the elliptic curve.

The application of a cryptographic system to elliptic curves has the following advantages:
  The first data object key can be any natural number from the interval [1, n−1]. It is not bound to any further functional conditions; the aspect of its arbitrariness will play a significant role later in the process.
  Breaking a cryptographic system on elliptic curves is highly complex, much more so than for RSA.
  The keys are very short in comparison to RSA, and the calculations on the curve are relatively simple, whereby they can be implemented versatilely and efficiently.
  The second data object key can be calculated simply from the first data object key and can be re-calculated at any time.
  The first data object key can be calculated very efficiently from the login name and the random value via the functions f and g. Thus it is possible to allocate the cryptographic key pair to the chosen login name through mathematical functions. Due to this functional relationship, it is not necessary to retain a tabular assignment of key pair and a corresponding login name.

According to a further embodiment of the invention, the method includes the step of the admissibility test of the first data object key. During the admissibility test, it is checked whether the first data object key is greater than 1 and smaller than the order of the elliptic curve. If this test condition is fulfilled, the random value, as well as the first and second data object keys, is permissible. However, if the test condition is not fulfilled, a new random value is selected, with which the calculation of the first data object key takes place anew, and the admissibility test is performed again on this data object key. This process is repeated until the admissibility test is passed.

The admissibility test can be expanded by further test conditions, for example, with the test that the first data object key features a high randomness. Here it must be noted that in cryptography one normally works with algebraic structures that contain finite numbers of elements. This is due to the fact that in the case of a finite number of elements, many simple problems in the real numbers become difficult, so that elliptic curves with finite numbers of elements can be used effectively for cryptographic applications. For cryptographic applications it is important that the algebraic structure used is large enough, that is, that the number of points on an elliptic curve, designated as the order, is sufficiently large. In this context, one must consider that the generated first data object key can be greater than the order of the elliptic curve. In order to enable an association here, it is common to carry out a division of the first data object key modulo the order of the elliptic curve. However, this results in a high probability that the resulting number is in a lower codomain of the interval [2, r−1] (with r as the order of the elliptic curve), or is even 0 or 1, such that the difficulty of figuring out, mathematically or through trial and error, a point on the curve lying in this codomain, is hereby reduced. Performing the admissibility test reliably prevents restriction of the codomain in which the first data object key is found, such that hereby the entropy of the first data object key and with it, its randomness, can be sufficiently assured.

A further advantage of the admissibility test is that its use assures that compatibility of the first data object key with corresponding program libraries for elliptic curves, as available according to the state of the art, can be reliably guaranteed.

It must be noted here that to execute the method for generating an asymmetric cryptographic key pair using an elliptic curve function, performing the admissibility test is not absolutely necessary. Even without using the admissibility test, key pairs can be generated here; however, depending on login name and random value, they may not allow for very high security requirements, which might be required for cryptographic applications. In the case of elliptic curves, the admissibility test is a further step to ensure that the generated key pairs do fulfill said security requirements.

According to one embodiment of the invention, the bit length of the random value is greater than or equal to the bit length of the order of the elliptic curve. In addition, according to one embodiment of the invention, the random value is chosen such that the value of the generated first data object key is smaller than the order of the elliptic curve. Both criteria have the same effect, as discussed already for the admissibility test, namely that thus a high entropy of the first data object key can be ensured. In other words, the security of the first data object key and, with it, the security of the encryption method, is significantly increased.

According to one embodiment of the invention, the key pair is calculated for an RSA cryptographic system. An RSA cryptographic system is given through a number n, which is the product of two prime numbers p and q (n=p·q), the number d, which satisfies the condition GCD(d, (p−1)·(q−1))=1 and the number e, which satisfies the condition e·d≡1 mod(p−1)· (q−1) ("GOD" stands for greatest common divisor). After the selection of d and the calculation of e, the values p, q and (p−1)·(q−1) must be deleted. Which of the two numbers e and d is the public key and which is the private key, is in principle arbitrary in RSA; in this invention the functions f and g calculate the first data object key d from the login name pw and the random value z. Using the extended Euclidean algorithm, the second data object key e is calculated from the first data object key d.

The advantages of the RSA method are the facts that with appropriately long selected keys the method is still very secure and that it has a wide distribution. However, RSA also has the disadvantages that due to the necessarily large key length, it is slow in operation, and modern factorization algorithms give rise to the concern that RSA will be broken in the not too distant future.

For RSA it is possible to calculate the first data object key from the login name and random value by means of the functions f and g. For this reason it is also possible for RSA to assign a cryptographic key pair to the selected login name through mathematical functions. Due to this functional relationship, maintaining a tabular assignment of key pair and corresponding login name is not necessary for RSA either.

According to another aspect of the invention, the method includes the step of the admissibility test of the first RSA data object key. During the admissibility test it is checked whether the first data object key d satisfies the conditions d lies in the interval $[2, (p-1)\cdot(q-1)-2]$ and
GCD $(d, (p-1)\cdot(q-1))=1$.

If these test conditions are fulfilled, the random value, as well as the first and second data object keys, is admissible. If the test condition is not fulfilled, however, a new random value z is selected, with which the calculation of the first data object key takes place anew, and the admissibility test is performed again on this data object key. This process is repeated until the admissibility test is passed.

According to another embodiment of the invention, the random value is retrieved from a database, whereby the random value is uniquely assigned to the user ID. For example, in the first execution of the method for generating an asymmetric key pair, a random value is generated once from a trusted location such as a certificate authority, which, if the first data object key is admissible, must be indirectly accessible to an appropriate use for cryptographic processes. Through storage of the random value in a database, assigned to the unique user ID, a computer program which performs the method according to the invention for generating an asymmetric key pair, can retrieve the random value over a secure communication connection using the user ID and use it to generate the respective first and, if necessary, second data object keys.

The random value is preferably stored encrypted in the database. According to one embodiment of the invention, a symmetrical encryption such as the application of AES-256, can be used for this. The application of an encrypted random value has the advantage that dictionary attacks for trial decryption of the first key can be prevented thereby.

According to another embodiment of the invention, the computer program products are developed through applets or browser plug-ins. It is also possible to prepare the computer program products as independent applications for a data processing system. The use of an applet or browser plug-in has the advantage that existing data processing systems for performing the method for key generation and consequently also for performing cryptographic operations such as encryption, decryption and creation and verification of digital signatures need not be converted: here loading an applet—which can carry out the operations described in a secure manner—for example over the internet, suffices alone.

In a further aspect, the disclosed subject matter pertains to a computer program product with instructions that can be carried out by a processor for performing process steps for decryption of a data object, whereby the data object is stored encrypted with a second data object key in a first database, whereby the encrypted data object is identifiable by means of a unique user ID, whereby the process includes the reception of the user ID and a login name assigned to the user ID. Further, the process includes the retrieval from a second database of a random value assigned to the user ID. The calculation of a first data object key follows, whereby the random value and the login name go into the calculation, whereby the first and second data object keys form an asymmetric cryptographic key pair. After retrieval of the encrypted data object from the first database, decryption of the encrypted data object with the first data object key takes place.

As already mentioned above, such a method for decryption of a data object has the advantage that decryption is possible only with knowledge of the secret login name. Typically only an authorized user knows the login name, so only with this person's active cooperation and approval is decryption of data objects even possible. Even if unauthorized parties were to come into possession of the second data object key, the user ID and the random value, decryption of the data object would still not be possible.

In another aspect the invention pertains to a computer program product with processor-executable instructions for performing process steps for generation of a digital signature of a data object, whereby the process includes the reception of the user ID and a login name assigned to the user ID. Further, the process includes the retrieval of a random value assigned to the user ID from a second database. Then a first data object key is calculated, whereby the random value and the login name go into the calculation, whereby the first and second data object keys form an asymmetric cryptographic key pair. After calculation of the first data object key, the digital signature is generated, into which the first data object key and, for example, the cryptographic hash value of the data object are incorporated. The digital signature is saved together with the identification of the data object in the first database.

According to one embodiment of the invention, the random value z is retrieved over a secure communication connection from the second database.

According to one embodiment of the invention, the random value z is stored encrypted in the second database.

According to one embodiment of the invention, the calculation of the first data object key takes place using a collision-free one-way function g such as a cryptographic hash function, which is applied to the login name.

According to another embodiment of the invention, the login name is received as the result of a collision-free one-way function g such as a cryptographic hash function.

According to another embodiment of the invention, the first data object key is calculated through application of a collision-free one-way function f such as a cryptographic hash function to the functional connection of two arguments: the random value z and the result of g(login name). This functional connection can for example be concatenation, that is, the linking of one after another.

According to another embodiment of the invention, the data object is a medical data object.

According to another embodiment of the invention, the computer program products are designed for decryption or generation of a digital signature through applets or browser plug-ins.

In another aspect, the invention pertains to a data processing system for generation of an asymmetric cryptographic key pair, whereby the data processing system includes means for reception of an arbitrarily selectable login name, means for calculating a first data object key, whereby a random value and the login name go into the calculation, and means for calculating a second data object key from the first data object key, whereby the first and second data object keys form the asymmetric cryptographic key pair.

According to one embodiment of the invention, the data processing system is a data processing system of a trusted location such as a certificate authority or a trust center. Alternatively, it is also possible to provide an appropriate, preferably portable hardware unit, which includes the data processing system as the trustworthy location. In another alternative, the trusted location can be the client itself that undertakes the cryptographic operations.

According to another embodiment of the invention, the data processing system is a data processing system that runs on a separate, secure hardware module. Here a Trusted Platform Module (TPM) can be used, for example.

BRIEF DESCRIPTION OF THE FIGURES

In the following section, embodiments of the invention are described more fully using the drawings.

FIG. 3: a flow chart of a method for key generation, asymmetrical encryption of data, and signature verification.

In the following, elements similar to one another are given the same reference number.

DETAILED DESCRIPTION

Figure 1:
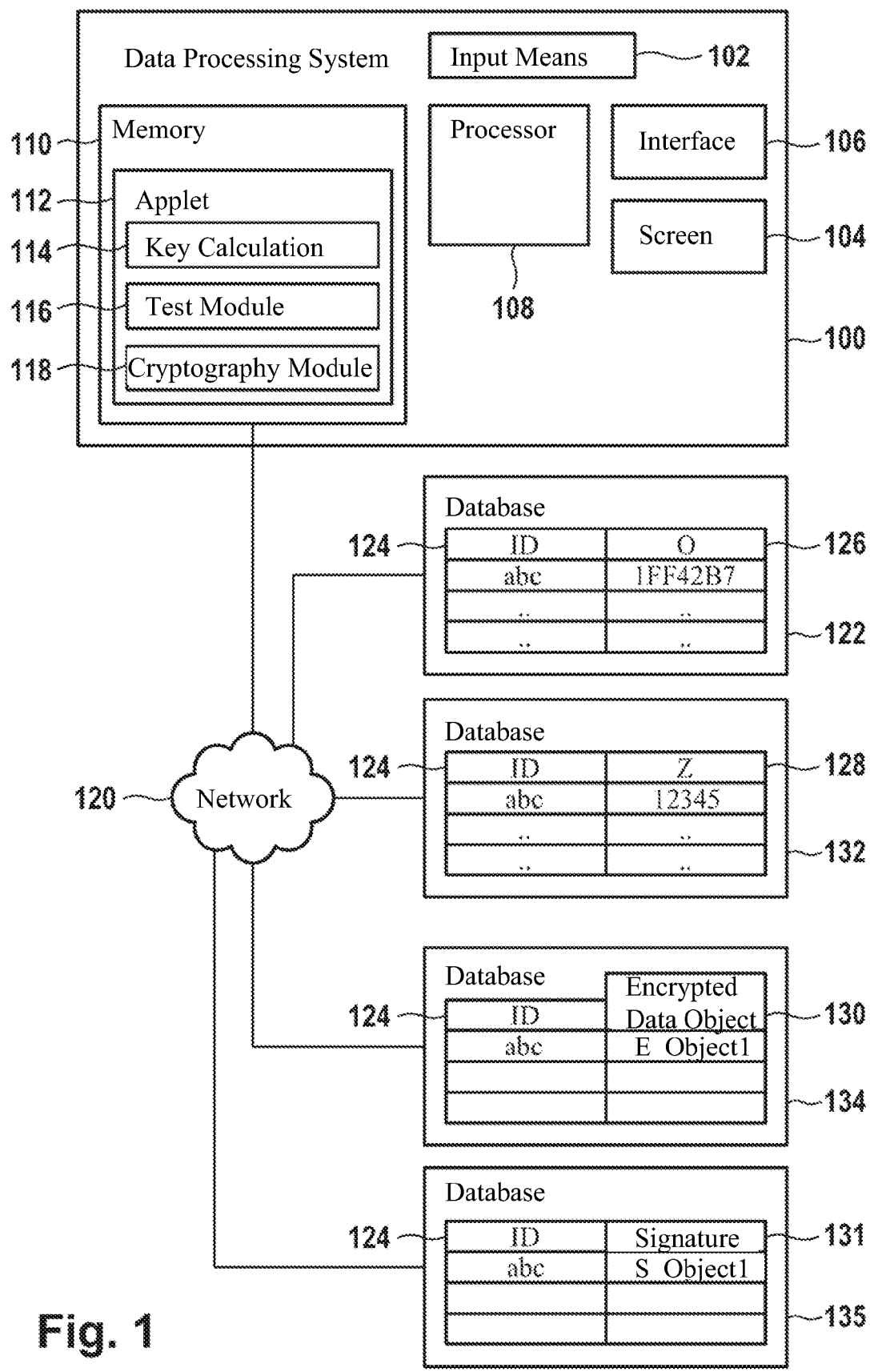
FIG. 1: a block diagram of a data processing system.

FIG. 1 shows a data processing system 100. The data processing system includes input means 102 such as a keyboard, a mouse, a PIN pad, or means for acquiring biometric characteristics such as a fingerprint scanner or an iris scanner. Further, the data processing system 100 includes a screen 104 as well as an interface 106, which for example can be used for communication with a network 120 such as the internet. Further, the data processing system 100 includes a processor 108, which is designed to carry out instructions for performing process steps. These instructions are contained in the form of an applet 112 in the memory 110, for example.

For example, the data processing system 100 can be used to generate asymmetric cryptographic key pairs and for subsequent encryption and decryption of data objects as well as generation and verification of digital signatures and for further cryptographic operations. This requires first a calculation of key pairs, which can take place by means of module 114 of the applet 112, for example. For calculation of keys using module 114, the process is as follows: An arbitrarily selectable login name is first received by a user via input means 102. From the login name a first data object key is thereupon calculated, whereby a random value, generated through the data processing system 100, and the login name go into the calculation. The first data object key calculated here is a private key of the user, whereby it is possible that for use of the first data object key in cryptographic applications, additional parameters must also be disclosed in order to use the first data object key to perform cryptographic operations. As already noted above, in the case of elliptic curves, it is necessary to make the domain parameters of the elliptic curve available in addition to the first and second data object keys; said parameters in combination with the first and second data object keys make possible the use of cryptographic operations. It is similar for RSA, in that the natural number n must be published in order to be able to perform cryptographic operations.

After calculation of the first data object key, a test of the data object key takes place by means of the test module 116. This test serves as an admissibility test of the first data object key, namely whether the generated first data object key fulfills various security aspects.

For example, in elliptic curves the public key, that is, the second data object key, is calculated from the first private data object key, in that a curve point of an elliptic curve is multiplied with the secret key. In this case the admissibility test of the first data object key consists of checking whether the first data object key is greater than 1 and smaller than the order of the elliptic curve, whereby if this test condition is satisfied, the random value and the first and second data object keys are admissible. However, if this is not the case, a new first data object key and thus also a new second data object key must be calculated, in that a new random value is chosen and the process for key calculation by means of module 114, as well as the process for testing the generated keys by means of module 116, must be performed again.

The random value used for key calculation is thereupon stored in a database 132 and encrypted if necessary. This takes place for example such that a unique user ID is assigned, whereby the previously generated random value 128 is assigned in a table of database 132 to this user ID 124. In the present example of FIG. 1, the random value Z is assigned to the login name "abc" with the value "12345." As already mentioned above, here the random value is preferably stored in encrypted form in database 132 in order to securely prevent dictionary attacks on the first data object key.

In another database 122, public key 126 generated by means of the key calculation module 114 is likewise stored assigned to the user ID 124. For example, the public key "1 FF42B7" is in turn assigned to the user ID "abc."

In the following it is assumed that in a database 134 likewise a data object 130 is stored encrypted and assigned to the user ID 124. The data object is thereby encrypted with the public key 126, which is saved in database 122. For decryption of the data object 130, the process is as follows: A user enters his user ID and the login name chosen in the user ID, via the input means 102. Then by means of module 114 the calculation of the first data object key takes place using the random value 128, which is retrieved from database 132 with the help of the user ID 124. The random value 128 and the login name, which were previously entered via the input means 102 into the data processing system, go into this calculation of the first data object key, as already mentioned above.

By means of the secret and private data object key thus generated, it is now possible to decipher data object 130.

In a database 135, at least one signature 131 S_Object 1 of the data object, as well as optionally the data object 130 itself, can be stored. The data object 130 is thereby signed with the secret key, which is assigned to the public key 126. The verification of the signature accordingly takes place with the public key 126.

Here it must be noted that the arbitrarily selected login name, which is entered into the data processing system 100 via the input means 102, can for example be a combination of numbers, a combination of numbers and letters, or even a biometric characteristic. For example, if using a biometric characteristic, a bit string can be calculated uniquely from the biometric data, which then is entered as the login name into the key calculation via module 114.

It must further be noted that in particular with the encryption and decryption of medical data objects by the data processing system 100, the process is as follows, for example: A medical data object is received via interface 106 from an imaging medical instrument such as an x-ray machine. X-ray data are typically image data that represent extensive quantities of data. The data processing system generates a randomly symmetrical key with which this medical x-ray data is encrypted. Thereupon this encrypted data is saved on database 134 with the associated unique user ID 124. Then the generated symmetrical key is encrypted with the public key 126. This symmetrical key so encrypted is likewise stored on database 134 with user ID 124 and the encrypted data.

For decryption, the encrypted symmetrical key is now decrypted by means of the cryptography module 118, in which the corresponding private key is generated using the login name as described above, and used for decryption. With the symmetrical key thus obtained, it is then possible to decrypt the encrypted data object 130.

Data objects 130 are preferably saved individually encrypted in the database 134. Even in the case of a set of semantically associated data objects, each individual data object is preferably saved encrypted on its own in database 134, so that in case of retrieval of a single data object, transmission of this encrypted data object 130 to the data processing system 100 takes place, whereupon its decryption is undertaken there. In contrast, if for semantically associated data objects that were combined, encrypted and stored in a single data object, one were to undertake the decryption in the database in order to minimize the volume of data being transported, the operator would have access to the decrypted data objects. The procedure described above has the advantage that at no point in time does the database 134 or its operator obtain access to the decrypted keys or data objects.

Figure 2A:
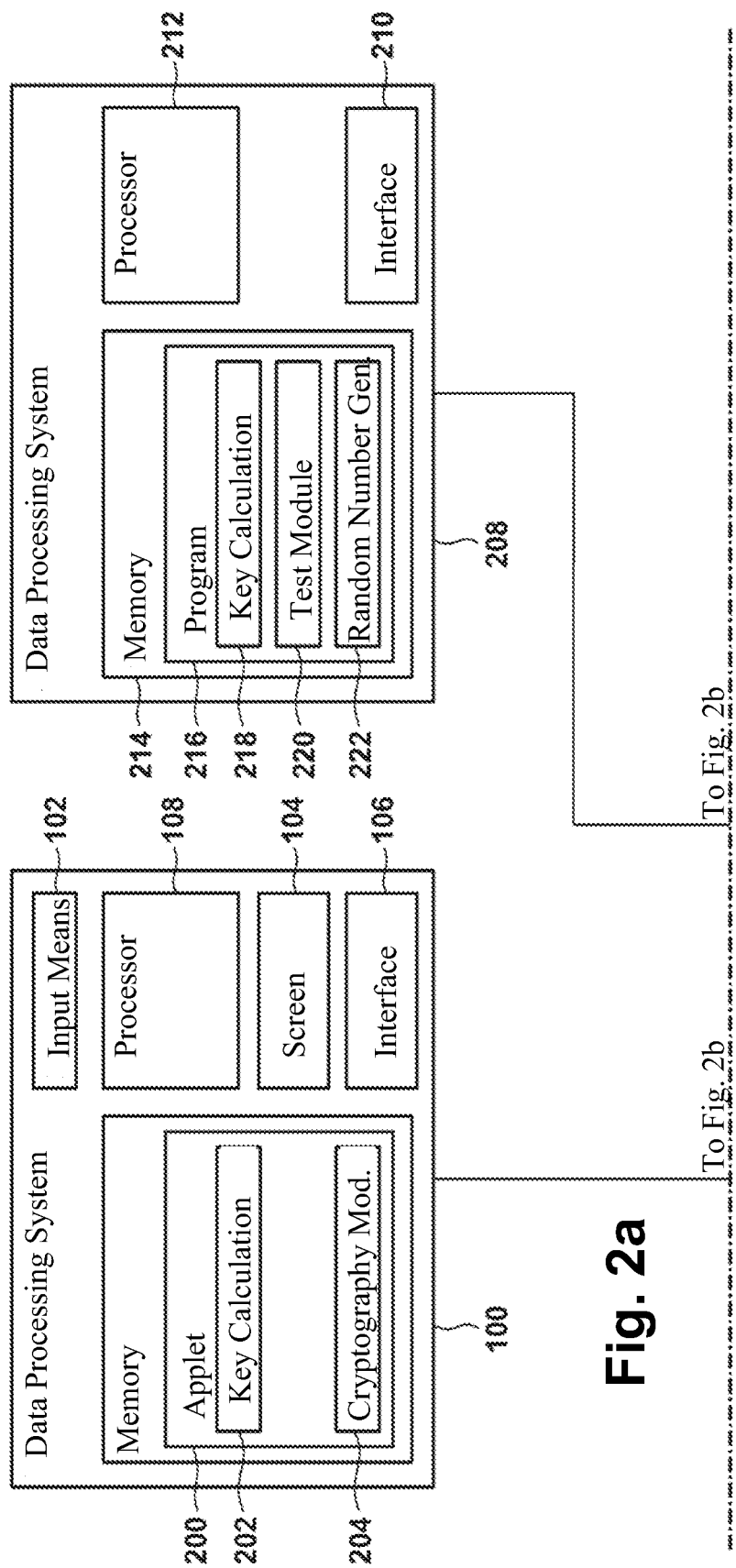
FIG. 2: a block diagram of another data processing system.
Figure 2B:
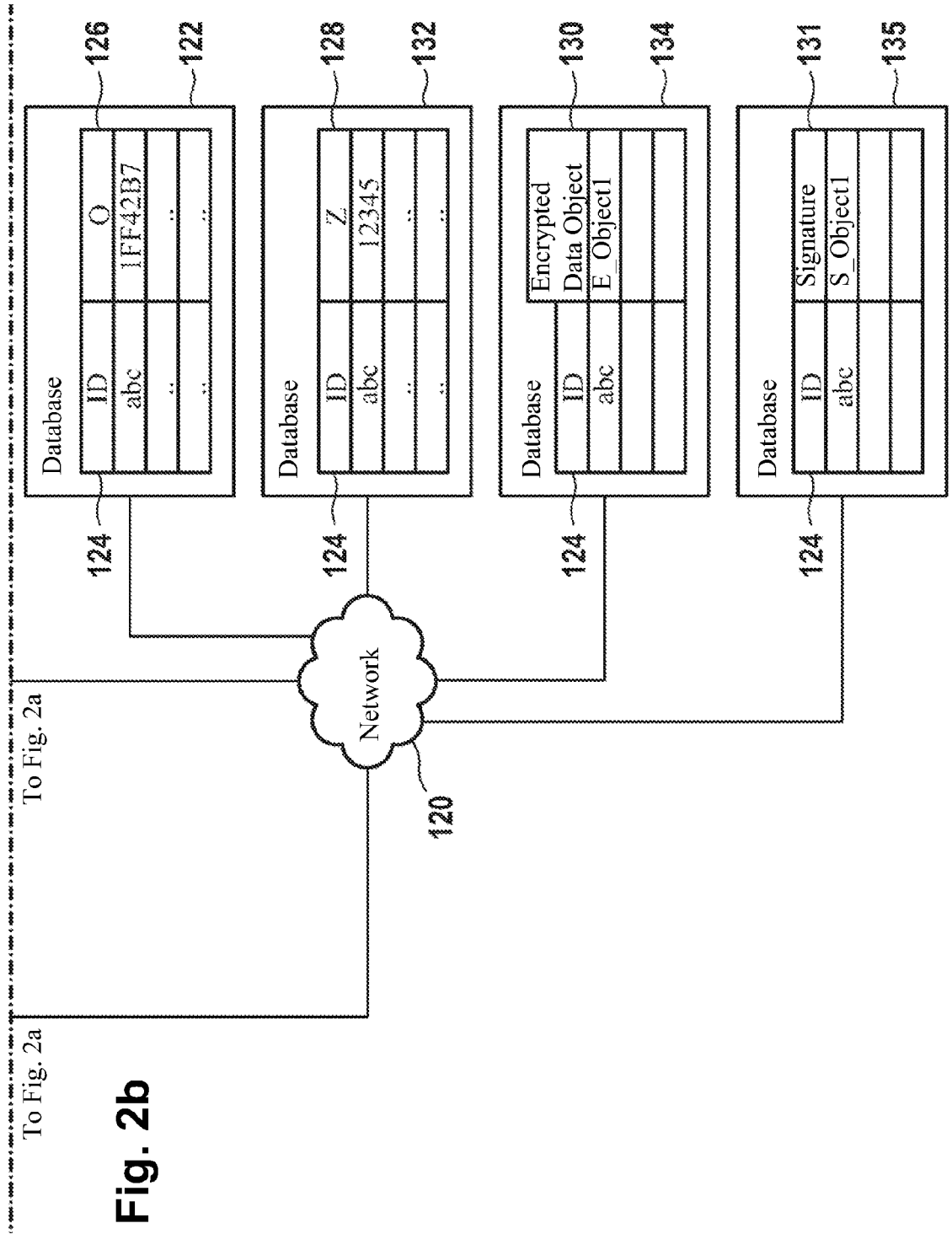

FIG. 2 shows another embodiment of data processing systems, which can be used to generate asymmetric key pairs and to perform cryptographic operations. In contrast to FIG. 1, FIG. 2 shows two data processing systems 100 and 208 that are independent from one another. The data processing system 100 in the present case in FIG. 2 features an applet 200, which for example can be loaded via the network 120 from the data processing system 208 using its interface 210. The applet includes software modules for key calculation 202 and a cryptography module 204.

The data processing system 208 features a processor 212 which is designed to process computer-executable instructions in the form of software modules of a program 216 contained in the memory 214. The program 216 features a module for key calculation 218, a test module 220 and a module for random number generation 222.

Furthermore, FIG. 2 shows the databases 122, 132, 134 and 135, which are connected over the network 120 with the interface 106 of the data processing system 100 and the interface 210 of the data processing system 208.

The data processing system 208 is preferably a data processing system of a trusted location. Thus program 216 runs with its modules in a secure environment so that it is ensured that unauthorized third parties cannot obtain access to the key calculation by means of module 218 or to the random number generation by means of module 222.

In the following it is assumed that an asymmetric key pair must be generated for a new user using elliptic curves. To this end the user enters an arbitrarily selectable login name via the input means 102. This login name is then transferred into the data processing system 208, which calculates a corresponding secret key and a public key by means of module 218 for key calculation. Module 222 for random number generation is used for calculation of the secret private key, whereby the private key is calculated such that first the function g is applied to the login name and then the function f is applied to the result of g(login name) and the random value that was generated by module 222. This yields the private data object key. For calculation of the public data object key, the first key is multiplied with a curve point of an elliptic curve by means of module 218. As further illustrated in FIG. 1, the generated random value and the public key are stored in appropriate databases. The test module 220 serves to check whether the calculated private key fulfills the necessary security conditions.

There are various alternatives to the procedure for key calculation described above. For example, it is possible to apply the function g to the entered login name already in data processing system 100 by means of the cryptography module 204. Then in this case the value g(login name) is communicated to the data processing system 208 for further use by module 218 for key calculation.

Likewise it is not absolutely necessary to save the public key 126 in a database 122. For example, it is possible here that the public key 126 is not saved at all. Through the use of the login name and the random value 128 retrievable with the user ID, it is possible to generate the public key 126 at any time through the module for key calculation 202 or 218. However, this represents an additional computational effort, which can be obviated through storage of the public key in database 122. Furthermore, in this case, the verification of digital signatures is impossible. The use of database 122 represents absolutely no security risk because the asymmetric private key needed for decryption cannot be calculated from the public key 126. Besides, the use of database 122 with public keys has the advantage that a user of data processing system 100, e.g. a doctor, can store encrypted medical data objects in database 134 at any time and furthermore that another user of data processing system 100, e.g. a patient, can at any time verify the digital signature 131 of retrieved objects that have been placed in the database 136 for him by other users such as doctors.

The patient's consent is not normally required for doctors to place medical data objects. The patient's consent only becomes necessary when the patient's personal stored medical information is being retrieved. However, as demonstrated above, this is possible only when the patient gives his active consent by entering his login name.

It must be noted that the use of databases 122, 132, 134 and 135 in FIG. 2 need not be exactly as shown in FIG. 2. The databases 122, 132, 134 and 135 can for example be integrated with one another, or they can also be made available as external databases of service providers. The data processing system 208 can be a central server, and the databases 122 and 132, as well as the data processing system, can be part of a public key infrastructure.

FIG. 3 shows the method according to the invention for generation of an asymmetric key pair and an example of its use for encryption of data objects and for verification of digital signatures of data objects. In step 300, a unique user ID is received. Then in step 302 it is checked whether a public key exists, to which the user ID received in step 300 is assigned. If this is the case, then in step 304 it is checked whether access to this public key is possible. If so, the public key is retrieved in step 306 and the data object can for example in step 308 be encrypted by means of the public key, or in step 328 the digital signature of a data object can be verified.

On the other hand, if the test in step 304 shows that access to the public key is not possible, then the public key must be generated. This takes place beginning with step 310, in which either an arbitrarily selectable login name is received and the function g is applied to this login name, or the value g(login name) is already received. Then follows step 312, in which a random value is retrieved from a corresponding database using the user ID. Through application of the function f to the random value and g(login name), the calculation of the private key takes place in step 314. Finally, in step 316 the public key is calculated from the private key, whereby the private and public keys form an asymmetric cryptographic key pair.

The calculation of the public key in step 316 takes place in elliptic curves for example thereby, that the public key is calculated through multiplication of the private key with a curve point of an elliptic curve. In this case, part of the domain parameters used for generating the public key must be known to the user of the encryption method of FIG. 3.

After calculation of the public key in step 316, encryption of the data object takes place in turn in step 308 by means of the public key, or verification of a digital signature of a data object takes place in step 328.

If test step 302 shows that no public key exists, this requires an initial generation of an asymmetric key pair. This occurs in that in step 318 either an arbitrarily selectable login name is received and the function g is applied to this login name, or the value g(login name) is already received.

Then the generation of a random number takes place in step 320, whereupon in step 322, as already described for step 314, a candidate for a private key is generated, in that the function f is applied to g(login name) and the random number.

In step 324 an admissibility test takes place, which, in the case of the elliptic curve method for example, consists of the test of whether the private data object key is greater than 1 and smaller than the order of the elliptic curve. If the admissibility test is passed, then the random value and the private key are admissible in step 324. Then the calculation of the public key can take place in step 326, whereupon for example the data encryption takes place in step 308, or the verification of the digital signature takes place in step 328.

On the other hand, if it becomes clear in step 324 that the candidate for a private data object key calculated in step 322 is not admissible, then in step 320 a random number is generated anew, and steps 322 and 324 are executed once again. This occurs until the admissibility test in step 324 is successful, whereupon step 326 with calculation of the public key and e.g. step 308 with data encryption, or step 328 with verification of the digital signature, are carried out.

Figure 4:
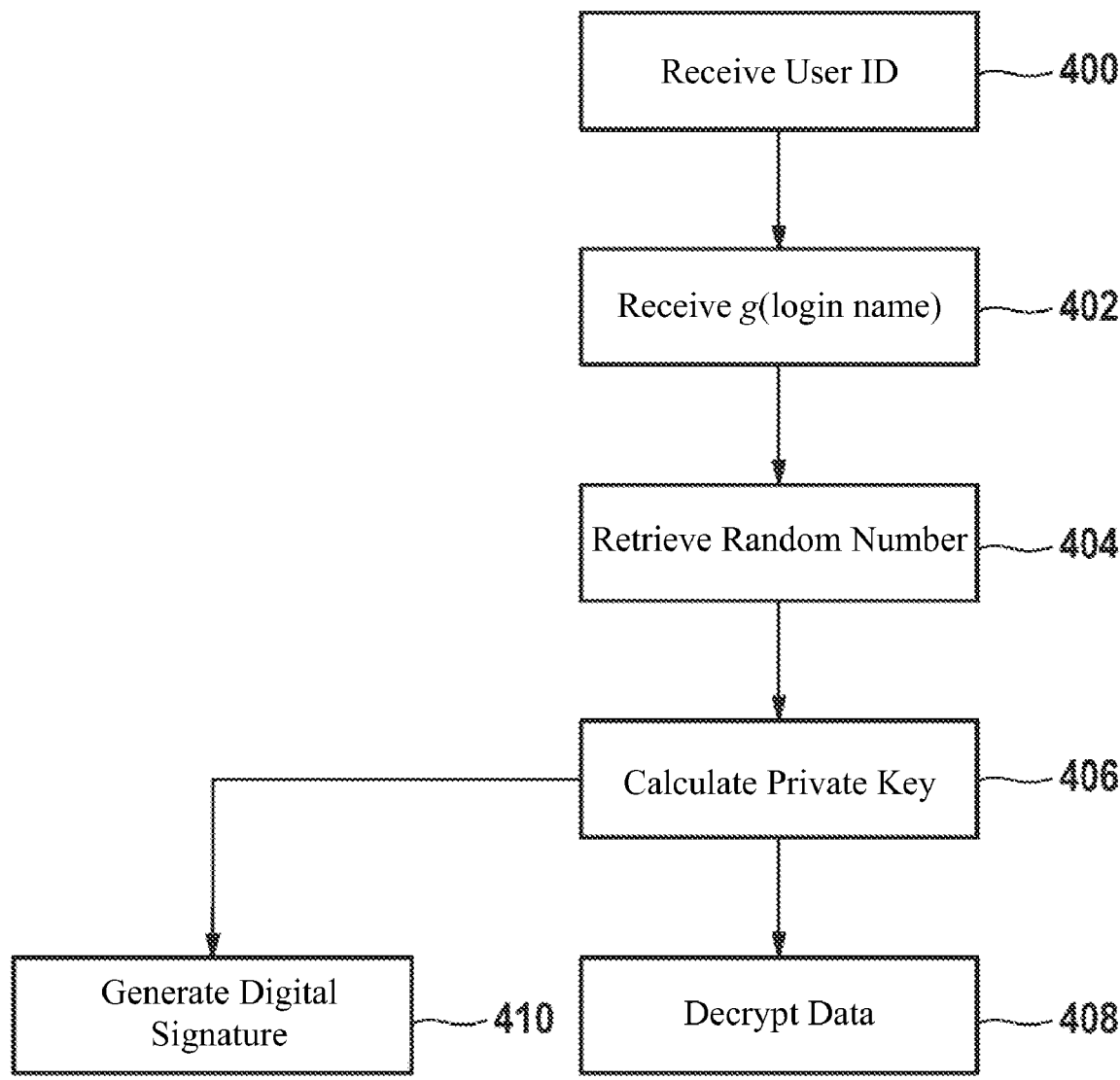
FIG. 4: a flow chart of a method for decryption of data and for generation of a digital signature of data by means of an asymmetric key method.

In FIG. 4 it is assumed that, as shown in FIG. 3, the private key has been calculated in step 322 and the public key has been calculated in step 326 for example using an elliptic curve. FIG. 4 shows a method for decryption of a data object, or for generation of a digital signature. The method begins with step 400, the reception of a unique user ID. Then in step 402 either a login name is received and the function g is applied to it, or g(login name) is received directly. Using the user ID, in step 404 a random number is retrieved from an external database, from which a private key can be calculated using function f in step 406. This private key can now be used to decrypt the data encrypted with the public data object key in step 408, or to generate a digital signature in step 410.

Figure 5:
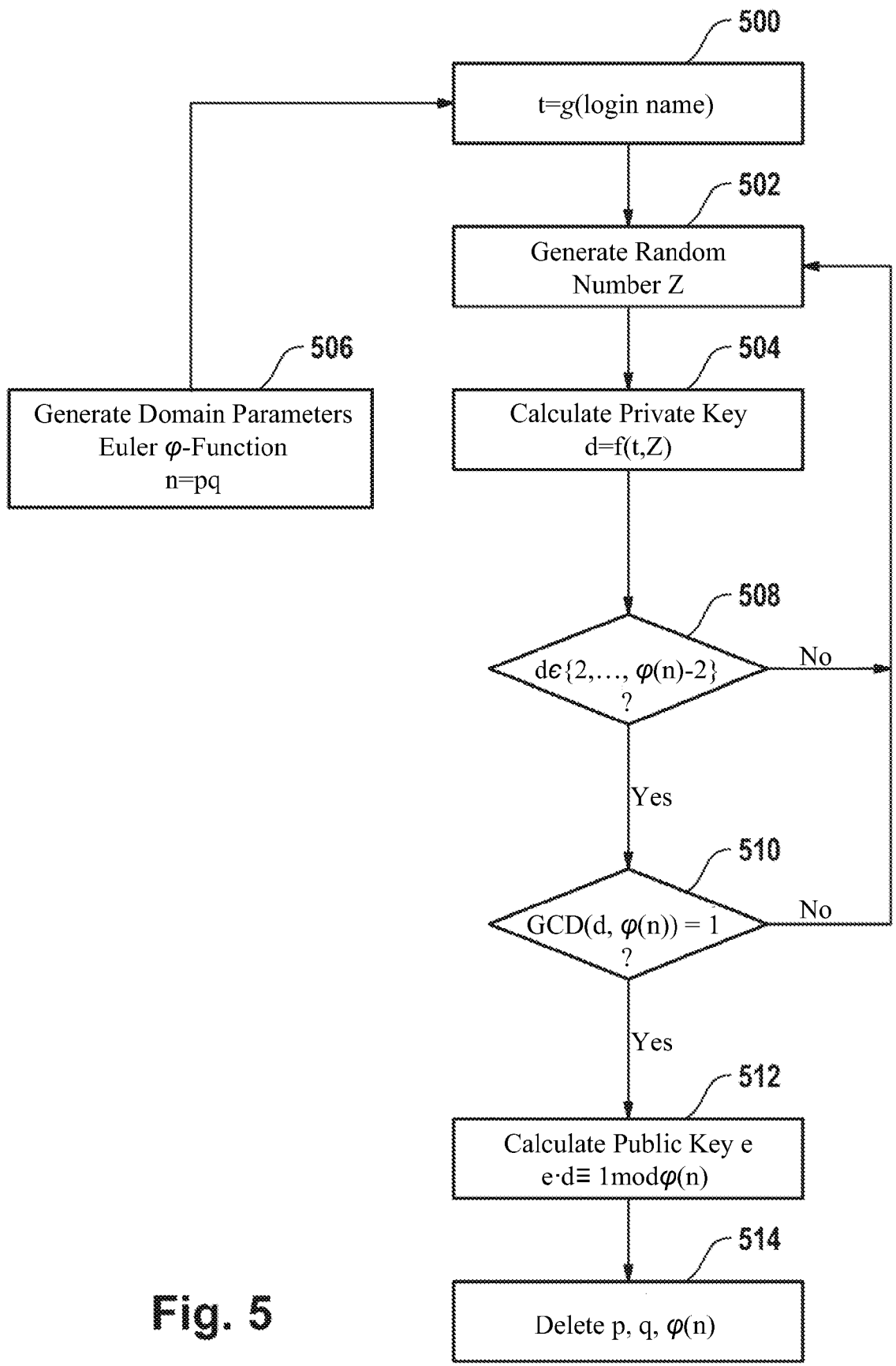
FIG. 5: a flow chart of a method for calculation of asymmetric keys according to the RSA method.

FIG. 5 shows a flow chart of a method for calculating an asymmetric key pair according to the RSA method. The process begins with step 506, in which two prime numbers p and q are chosen according to the current security requirements for RSA. The two numbers are multiplied with one another and the result is designated n. The Euler $\phi$ function is then applied to n such that one obtains the value $\phi(n)$.

In the following step 500, a login name is received, to which the function g is applied, or the function value g(login name) is received directly. Then follows step 502, in which a random value is generated. By applying function f to the random value and g(login name), the calculation of a candidate for the private key d takes place in step 504.

An admissibility test takes place in step 508, whereby the admissibility test proceeds in multiple stages in the case of the RSA method. Thus in step 508 it is checked whether d lies within the interval $[2, \phi(n)-2]$.

If the test step 508 shows that the test condition is not fulfilled, the process skips back to step 502, where a new random value is generated. Then step 504 follows with the renewed calculation of a candidate for the private key e using the new random value, and then the re-test of candidate d in step 508. This loop of steps 502, 504, and 508 repeats until the test condition in step 508 is fulfilled. Only then does the process continue with step 510.

Step 510 includes a further test step, namely whether $\phi(n)$ and the key candidate d are relatively prime, that is, GCD(d, $\phi(n)$)=1. If this is not the case, the process skips back to step 502 and a new random value is generated, followed by steps 504, 508, 510. This loop of steps 502, 504, 508 and 510 also repeats until the test condition in step 510 is fulfilled. Only then does the process continue with step 512. Test step 508 is preferably performed before test step 510, because the calculation effort for step 508 is significantly lower than the calculation effort for step 510.

In step 512 the calculation of the public key e finally takes place so that e fulfills the congruence relation $e \cdot d \equiv 1 \mod \phi(n)$ with $e \in [1, \phi(n)-1]$. For use of the private key d in cryptographic processes, n must also be disclosed.

In the final step 514 the numbers p, q, and $\phi(n)$ are discarded, i.e., deleted.

In addition to test steps 508 and 510, further test steps can be employed to increase the security of the asymmetric key pair generated.

LIST OF REFERENCE NUMBERS

100 Data processing system
102 Input means
104 Screen
106 Interface
108 Processor
110 Memory
112 Applet
114 Key Calculation Module
116 Test Module
118 Cryptographic Module
120 Network
122 Database
124 User ID
126 Public key
128 Random number
130 Encrypted data object
131 Digital signature
132 Database
134 Database
135 Database
200 Applet
202 Key Calculation Module
204 Cryptographic Module
208 Data processing system
210 Interface
212 Processor
214 Memory
216 Program
218 Key Calculation Module
220 Test Module
222 Random Number Generation Module

What is claimed is:

1. A method for login name-based generation of an asymmetric cryptographic key pair, the method comprising:
    reception of a unique user ID and an arbitrarily selectable login name assigned to said user ID;
    calculation of a function value g(login name) through application of a function g to said login name;
    generation of a random value;
    calculation of a first data object key through application of a function $f$ to said random value and said function value g(login name);
    whereby the method further comprises:
        performance of an admissibility test of said first data object key according to test conditions, whereby said test conditions comprise the applicability of said first data object key for generation of a second data object key from said first data object key by means of an asymmetric cryptographic key generation method;
        if said test conditions are fulfilled, calculation of said second data object key from said first data object key, whereby said first and second data object keys form an asymmetric key pair;
        if one or more of said test conditions are not fulfilled, calculation of a new first data object key with a new random value, and renewed execution of said admissibility test.

2. The method according to claim 1, the method additionally comprising one or more of the following steps:
    encryption of a data object with said second data object key of said key pair;
    decryption of a data object with said first data object key of said key pair;
    generation of a digital signature of a data object with said first data object key of said key pair;
    verification of a digital signature of a data object with said second data object key of said key pair; and
    performance of other cryptographic operations with said data object keys of said key pair.

3. The method according to claim 2, whereby g is a one-way function.

4. The method according to claim 1, whereby said asymmetric key pair is formed for one or more of elliptic curves, RSA, DLP, or another cryptographic system.

5. The method according to claim 4, whereby the method comprises one or more of the following steps:
    encryption of a data object with said second data object key of said key pair;
    decryption of a data object with said first data object key of said key pair;
    generation of a digital signature of a data object with said first data object key of said key pair;
    verification of a digital signature of a data object with said second data object key of said key pair; and
    performance of other cryptographic operations with said data object keys of said key pair.

6. The method according to claim 5, whereby g is a one-way function.

7. A non-transitory computer readable medium having a program encoded thereon for an asymmetric cryptographic key pair, the program comprising the steps of:
    reception of an arbitrarily selectable login name;
    calculation of a first data object key, whereby said first data object key is calculated through application of a function $f$ to a random value and a function value g(login name), said function value g(login name) calculated through application of a function g to said login name, whereby said function $f$ is a one-way function;
    whereby the steps further comprise:
        performance of an admissibility test of said first data object key by one or more test conditions, whereby said test conditions comprise the applicability of said first data object key for generation of a second data object key from said first data object key by means of an asymmetric cryptographic key generation method;
        if said test conditions are fulfilled, calculation of said second data object key from said first data object key by an asymmetric cryptographic key generation method, whereby said first and second data object keys form the cryptographic key pair;
        if one or more of the test conditions are not fulfilled, calculation of a new first data object key with a new random value, and renewed execution of said admissibility test.

8. The non-transitory computer readable medium according to claim 7, whereby said calculation of said first data object key takes place using a function g, which is applied to said login name, whereby said function g is a one-way function.

9. The non-transitory computer readable medium according to claim 7, whereby said login name is received as a function value of a function g, which was applied to said login name, whereby said function g is a one-way function.

10. The non-transitory computer readable medium according to claim 7, whereby said asymmetric cryptographic key generation method is a method based on elliptic curves, whereby said second data object key is calculated through multiplication of said first data object key with a curve point on an elliptic curve.

11. The non-transitory computer readable medium according to claim 10, whereby said test condition is the condition that said first data object key is greater than one and smaller than the order of said elliptic curve.

12. The non-transitory computer readable medium according to claim 10, whereby said test condition is the condition that the bit length of said random value is greater than or equal to the bit length of the order of the elliptic curve.

13. The non-transitory computer readable medium according to claim 10, whereby said test condition is the condition that said random value is chosen such that the value of said first data object key is smaller than the order of said elliptic curve.

14. The non-transitory computer readable medium according to claim 7, whereby said asymmetric cryptographic key generation method is an RSA method, whereby said test condition is the condition that the Euler $\phi$ function of the modulus n used for the RSA key generation method and the first data object key are relatively prime.

15. The non-transitory computer readable medium according to claim 14, whereby said test condition is the further condition that said first data object key features a value between two and the value of the Euler $\phi$ function of the modulus n used for the RSA key generation method minus two.

16. The non-transitory computer readable medium according to claim 7, whereby said random value is retrieved from a database, whereby said random value is assigned uniquely to a user ID.

17. The non-transitory computer readable medium according to claim 16, whereby said random value is stored encrypted in said database.

18. The non-transitory computer readable medium according to claim 7, whereby the program is formed through an applet or a browser plug-in, or is an independent application that runs on a computer of a trusted location, or is an embedded application that runs in a secured hardware module.

19. A data processing system for generation of an asymmetric cryptographic key pair, whereby the data processing system comprises the following:
   means for reception of an arbitrarily selectable login name;
   means for calculation of a first data object key, whereby a random value and said login name are included in the calculation;
   means for calculation of a second data object key from said first data object key by means of an asymmetric cryptographic key generation method, whereby said first and second data object keys form said asymmetric cryptographic key pair;
   whereby the data processing system further comprises means for performing the following steps:
      performance of an admissibility test of said first data object key by means of one or more test conditions, whereby said test conditions comprise the applicability of said first data object key for generation of said second data object key from said first data object key by means of an asymmetric cryptographic key generation method;
      if said test conditions are fulfilled, calculation of said second data object key from said first data object key;
      if one or more of said test conditions is not fulfilled, renewed calculation of a new first data object key with a new random value, and renewed execution of said admissibility test.

* * * * *